US010749179B2

(12) United States Patent
Takeda et al.

(10) Patent No.: US 10,749,179 B2
(45) Date of Patent: Aug. 18, 2020

(54) GRAPHITE-BASED NEGATIVE ELECTRODE ACTIVE MATERIAL, NEGATIVE ELECTRODE, AND LITHIUM ION SECONDARY BATTERY

(71) Applicant: ENVISION AESC ENERGY DEVICES LTD., Sagamihara-shi, Kanagawa (JP)

(72) Inventors: Kouzou Takeda, Kanagawa (JP); Hiroo Takahashi, Kanagawa (JP); Yasutaka Kono, Kanagawa (JP)

(73) Assignee: ENVISION AESC ENERGY DEVICES LTD., Sagamihara-shi (JP)

( * ) Notice: Subject to any disclaimer, the term of this patent is extended or adjusted under 35 U.S.C. 154(b) by 0 days.

(21) Appl. No.: 15/300,026

(22) PCT Filed: Mar. 30, 2015

(86) PCT No.: PCT/JP2015/059840
§ 371 (c)(1),
(2) Date: Sep. 28, 2016

(87) PCT Pub. No.: WO2015/152113
PCT Pub. Date: Oct. 8, 2015

(65) Prior Publication Data

US 2017/0179487 A1 Jun. 22, 2017

(30) Foreign Application Priority Data

Mar. 31, 2014 (JP) ................................ 2014-073710

(51) Int. Cl.

| | |
|---|---|
| ***H01M 4/587*** | (2010.01) |
| ***H01M 10/0525*** | (2010.01) |
| ***H01M 4/36*** | (2006.01) |
| ***C01B 32/20*** | (2017.01) |
| *H01M 4/02* | (2006.01) |

(52) U.S. Cl.
CPC ............ *H01M 4/587* (2013.01); *C01B 32/20* (2017.08); *H01M 4/364* (2013.01);
(Continued)

(58) Field of Classification Search
CPC ...... H01M 4/131; H01M 4/133; H01M 4/366; H01M 4/505; H01M 4/587
See application file for complete search history.

(56) References Cited

U.S. PATENT DOCUMENTS

2015/0162600 A1* 6/2015 Wakizaka ............ H01M 4/587 429/231.8
2017/0187064 A1* 6/2017 Takeda ............ H01M 10/0525

FOREIGN PATENT DOCUMENTS

CN 1481041 A 3/2004
CN 101485017 A 7/2009
(Continued)

OTHER PUBLICATIONS

Extended European Search Report dated Aug. 10, 2017 in related European Appl. No. 15772291.9 (9 pgs.).
(Continued)

*Primary Examiner* — Robert S Jones
*Assistant Examiner* — Rachel L Zhang
(74) *Attorney, Agent, or Firm* — Foley & Lardner LLP

(57) ABSTRACT

A graphite-based negative electrode active material including a first graphite particle being spheroidized and a second graphite particle having a roundness lower than the roundness of the first graphite particle, wherein the content of the second graphite particle based on the sum of the first graphite particle and the second graphite particle is in the range of 1 to 30% by mass, the ratio of a median particle diameter ($D_{50}$) to a particle diameter at 5 cumulative % ($D_5$), $D_{50}/D_5$, in a cumulative distribution of the first graphite particle is smaller than the ratio of a median particle diam-
(Continued)

eter ($D_{50}$) to a particle diameter at 5 cumulative % ($D_5$), $D_{50}/D_5$, in a cumulative distribution of the second graphite particle, and the tap density in saturation of the particle mixture of the first graphite particle and the second graphite particle is higher than both the tap density in saturation of the first graphite particle and the tap density in saturation of the second graphite particle.

16 Claims, 1 Drawing Sheet

(52) U.S. Cl.
CPC ...... *C01P 2004/32* (2013.01); *C01P 2004/53* (2013.01); *C01P 2006/11* (2013.01); *C01P 2006/40* (2013.01); *H01M 10/0525* (2013.01); *H01M 2004/021* (2013.01); *H01M 2004/027* (2013.01)

(56) References Cited

FOREIGN PATENT DOCUMENTS

| | | | |
|---|---|---|---|
| CN | 102362381 | A | 2/2012 |
| EP | 2 037 515 | A1 | 3/2009 |
| EP | 2 413 403 | A1 | 2/2012 |
| JP | H05-290844 | | 11/1993 |
| JP | 3152226 | B | 1/2001 |
| JP | 2002-008655 | A | 1/2002 |
| JP | 2004-127913 | A | 4/2004 |
| JP | 2009-026514 | A | 2/2009 |
| JP | 2009-117240 | A | 5/2009 |
| JP | 2009-245613 | A | 10/2009 |
| JP | 2010-073618 | A | 4/2010 |
| JP | 2010-092649 | A | 4/2010 |
| JP | 2010-251315 | A | 11/2010 |
| JP | 2013-008526 | A | 1/2013 |
| JP | 2013-201104 | A | 10/2013 |
| JP | 2013-254746 | A | 12/2013 |
| WO | WO-2014/003135 | A1 | 1/2014 |

OTHER PUBLICATIONS

International Search Report dated Jun. 23, 2015 in PCT/JP2015/059840 (4 pgs.).

Office Action dated Jul. 9, 2018 in related Chinese Appl. 201580018155.0 with English-language translation (20 pgs.).

* cited by examiner

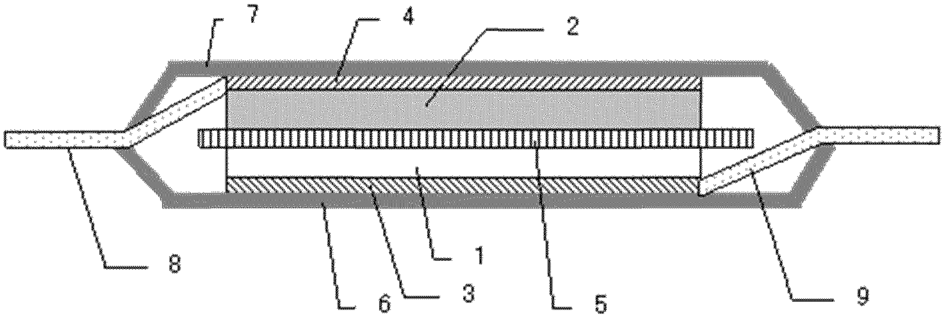
7
4
2
8
6
3
1
5
9

GRAPHITE-BASED NEGATIVE ELECTRODE ACTIVE MATERIAL, NEGATIVE ELECTRODE, AND LITHIUM ION SECONDARY BATTERY

TECHNICAL FIELD

The present invention relates to a graphite-based negative electrode active material, a negative electrode, and a lithium ion secondary battery.

BACKGROUND ART

Lithium ion secondary batteries have high energy density and excellent charge/discharge cycle characteristics, and are thus widely used for a power supply for compact mobile devices such as cellular phones and laptop computers. In addition, the recent increasing environmental considerations and growing consciousness of energy saving have been promoting a demand for large batteries having a large capacity and a long life in the fields of electric vehicles, hybrid electric vehicles, power storage, etc.

In general, a lithium ion secondary battery primarily consists of: a negative electrode including a negative electrode active material of a carbon material capable of intercalating and deintercalating a lithium ion; a positive electrode including a positive electrode active material of a lithium composite oxide capable of intercalating and deintercalating a lithium ion; a separator separating the negative electrode and the positive electrode; and a non-aqueous electrolytic solution prepared by dissolving a lithium salt in a non-aqueous solvent.

Amorphous carbon or graphite is used for the carbon material used as the negative electrode active material, and graphite is typically used particularly in an application which requires a high energy density.

For examples, Patent Literature 1 discloses that in order to obtain a non-aqueous electrolytic solution secondary battery which exhibits a high capacity and a high charge/discharge efficiency, a negative electrode active material is used which includes a carbon material containing at least two materials of a scale-shaped graphite particle and a graphite material the surface of which is covered with amorphous carbon and which is not scale-shaped, the packing density of the negative electrode being in the range of 1.3 to 1.8 g/cc, the specific surface area of the negative electrode being in the range of 2.1 to 4.1 $cm^2/g$, and the fraction of the scale-shaped graphite particle being in the range of 10 to 70 wt % based on the whole of the carbon material.

Patent Literature 2 discloses that in order to obtain a non-aqueous electrolyte battery which has a high capacity and high cycle characteristics and exhibits a high volume energy density even in discharging at a large current, a negative electrode active material is used which includes a negative electrode active material mixture of scale-shaped graphite and at least one or more carbon materials selected from spheroidal graphite, bulk graphite, fibrous graphite, non-graphitizable carbon, and carbon black, the content of the one or more carbon materials in the negative electrode active material mixture being in the range of 1 wt % or more and 50 wt % or less.

Patent Literature 3 discloses that an active material including a mixture of an artificial graphite particle having a tap density of 1 $g/cm^3$ or higher and a spheroidal graphite particle having a large roundness is used for the purpose of significantly improving the charge/discharge cycle characteristics of a high-energy density lithium secondary battery, and simultaneously enhancing or maintaining the discharge rate characteristics, the discharge characteristics at low temperatures, and the heat resistance. Patent Literature 3 also discloses that the fraction of the spheroidal graphite particle based on the whole of the active material is preferably 5 to 45% by mass.

Patent Literature 4 discloses a negative electrode active material for a lithium ion secondary battery, wherein the negative electrode active material is a powder mixture of a graphite powder A which is obtained by mixing a scale-shaped natural graphite and a binder pitch, and subjecting the resultant to molding, calcination for graphitization, and pulverization, and has a tap density of 0.4 to 0.9 $g/cm^3$, $D_{90}/D_{10}$ of 3.5 to 7.0, and $D_{50}$ of 10 to 20 μm, and a graphite powder B which is obtained by covering a spheroidized natural graphite with a pitch and calcining the resultant for graphitization, and has a tap density of 0.9 to 1.4 $g/cm^3$, $D_{90}/D_{10}$ of 2.0 to 3.5, $D_{50}$ of 10 to 20 μm, and a roundness of 0.91 or higher, and the mixing ratio by weight of the graphite powder A is 20 to 80% and the mixing ratio by weight of the graphite powder B is 20 to 80%. Patent Literature 4 also discloses that the object is to provide a negative electrode active material for a lithium ion secondary battery having a high electrode density, an excellent permeability of an electrolytic solution, a small capacity loss due to charging/discharging, and good cycle characteristics.

CITATION LIST

Patent Literature

Patent Literature 1: JP3152226B

Patent Literature 2: JP2002-008655A

Patent Literature 3: JP2004-127913A

Patent Literature 4: JP2010-092649A

SUMMARY OF INVENTION

Technical Problem

However, lithium ion secondary batteries with a graphite-based negative electrode active material are required to be further improved in cycle characteristics.

An object of the present invention is to provide a graphite-based negative electrode active material for a lithium ion secondary battery having excellent cycle characteristics, a negative electrode using the same, and a lithium ion secondary battery having improved cycle characteristics.

Solution to Problem

According to one aspect of the present invention is provided a graphite-based negative electrode active material including a first graphite particle being spheroidized and a second graphite particle having a roundness lower than the roundness of the first graphite particle, wherein the content of the second graphite particle based on the sum of the first graphite particle and the second graphite particle is in the range of 1 to 30% by mass, the ratio of a median particle diameter ($D_{50}$) to a particle diameter at 5 cumulative % ($D_5$), $D_{50}/D_5$, in a cumulative distribution of the first graphite particle is smaller than the ratio of a median particle diameter ($D_{50}$) to a particle diameter at 5 cumulative % ($D_5$), $D_{50}/D_5$, in a cumulative distribution of the second graphite particle, and the tap density in saturation of the particle mixture of the first graphite particle and the second graphite particle is higher than both the tap density in saturation of the first graphite particle and the tap density in saturation of the second graphite particle.

According to another aspect of the present invention is provided a negative electrode for a lithium ion secondary battery including the above graphite-based negative electrode active material.

According to still another aspect of the present invention is provided a lithium ion secondary battery including: a positive electrode including a positive electrode active material capable of intercalating and deintercalating a lithium ion; the above negative electrode; and a non-aqueous electrolytic solution.

Advantageous Effects of Invention

According to an exemplary embodiment, a graphite-based negative electrode active material for a lithium ion secondary battery having excellent cycle characteristics and a negative electrode using the same, and a lithium ion secondary battery having improved cycle characteristics can be provided.

BRIEF DESCRIPTION OF DRAWING

FIG. 1 is a cross-sectional view for describing an example of a lithium ion secondary battery according to an exemplary embodiment.

DESCRIPTION OF EMBODIMENT

Hereinafter, an exemplary embodiment will be described.

A graphite-based negative electrode active material according to an exemplary embodiment includes a first graphite particle being spheroidized and a second graphite particle having a roundness lower than the roundness of the first graphite particle, and the content of the second graphite particle based on the sum of the first graphite particle and the second graphite particle is in the range of 1 to 30% by mass. In the graphite-based negative electrode active material, the ratio of a median particle diameter ($D_{50}$) to a particle diameter at 5 cumulative % ($D_5$), $D_{50}/D_5$, in a cumulative distribution of the first graphite particle is smaller than the ratio of a median particle diameter ($D_{50}$) to a particle diameter at 5 cumulative % ($D_5$), $D_{50}/D_5$, in a cumulative distribution of the second graphite particle, and the tap density in saturation of the particle mixture of the first graphite particle and the second graphite particle is higher than both the tap density in saturation of the first graphite particle and the tap density in saturation of the second graphite particle.

Use of a graphite-based negative electrode active material including a first graphite particle and a second graphite particle which satisfy particular conditions for the particle shape, the particle size distribution, and the tap density in saturation to form a negative electrode allows a lithium ion secondary battery with the negative electrode to have enhanced battery performance, in particular, enhanced cycle characteristics.

The content of the second graphite particle based on the sum of the first graphite particle and the second graphite particle is set in the range of 1 to 30% by mass, and the content is preferably 5% by mass or more, and more preferably 10% by mass or more, and preferably 25% by mass or less, and more preferably 20% by mass or less. A too much content or too little content of the second graphite particle makes it difficult to obtain a desired effect of enhancing cycle characteristics. In the case that a natural graphite particle and an artificial graphite particle are used for the first graphite particle and the second graphite particle, respectively, for example, the particle can be prevented from being crashed or excessively deformed (in particular, near the surface) when being pressed in fabrication of an electrode due to the fact that an artificial graphite particle is generally harder than a natural graphite particle, and a force can be homogeneously transmitted in the thickness direction of an electrode, resulting in a homogeneous density distribution in the thickness direction. An electrode having a homogeneous density distribution, in which the particles contact with each other while keeping a moderate number of voids, is good in permeability and retention capacity for an electrolytic solution and electroconductivity, and can contribute to enhancement of battery characteristics such as cycle characteristics. In addition, a pressing pressure can be homogeneously transmitted in an electrode, which suppresses thickening of the electrode (spring back) due to a residual stress after pressing, and as a result the reduction of the capacity of the electrode can also be suppressed. Moreover, artificial graphite has fewer impurities attached to the surface than natural graphite, and thus a SEI (solid electrolyte interphase) film with a high quality tends to be formed. Owing to this, intercalation of a lithium ion occurs more preferentially at an artificial graphite particle than at a natural graphite particle, and as a result the cycle degradation of the natural graphite particle can be suppressed.

In the graphite-based negative electrode active material according to an exemplary embodiment, the ratio of a median particle diameter ($D_{50}$) to a particle diameter at 5 cumulative % ($D_5$), $D_{50}/D_5$, in a cumulative distribution of the first graphite particle is smaller than the ratio of a median particle diameter ($D_{50}$) to a particle diameter at 5 cumulative % ($D_5$), $D_{50}/D_5$, in a cumulative distribution of the second graphite particle. If such particle size distribution conditions are satisfied, the tap density in saturation of the particle mixture of the first graphite particle and the second graphite particle can be higher than the tap density in saturation in the case of a single configuration of each of the first graphite particle and the second graphite particle. A higher tap density in saturation increases the number of contact points between the graphite particles to ensure the electroconductivity, and thus the increase of resistance due to shortage of contact points caused by expansion and shrinkage in battery cycles is suppressed and the capacity is less likely to be degraded. If $D_{50}/D_5$ of the first graphite particle is smaller than $D_{50}/D_5$ of the second graphite particle, that is, the second graphite particle which has a relatively broad particle size distribution is added to the first graphite particle which has a sharp particle size distribution at the above-described ratio (1 to 30% by mass), the packing factor presumably increases, resulting in the increase of the tap density in saturation of the mixture. In this case, it is effective to use a spheroidized graphite particle for the first graphite particle and use the second graphite particle having a roundness lower than that of the first graphite particle for the second graphite particle. A scale-shaped graphite particle may be used for the second graphite particle. Too much content of the second graphite particle having a low roundness causes a large spring back or reduction of the peel strength of an electrode, which makes it difficult to respond to volume change in cycles, and as a result the capacity of the electrode tends to be lowered to degrade the cycle characteristics of the battery. In the case that artificial graphite is used for the second graphite particle, a too much content of the second graphite particle causes increase in cost due to the fact that artificial graphite is more expensive than natural graphite. Also from these viewpoints, the content of the second graphite particle is preferably 30% by mass or less, more preferably 25% by mass or less, and even more preferably 20% by mass or less.

Now, the graphite-based negative electrode active material according to an exemplary embodiment, the negative electrode using the same, and the lithium ion secondary battery will be described specifically.

(Graphite-Based Negative Electrode Active Material)

The first graphite particle is a spheroidized (non-scale-shaped) graphite particle, and the average particle roundness is preferably in the range of 0.6 to 1, more preferably in the range of 0.86 to 1, even more preferably in the range of 0.90 to 1, and particularly preferably in the range of 0.93 to 1. Spheroidization may be performed by using a conventional method. Such a first graphite particle is preferably a spheroidized natural graphite particle from the viewpoint of high-capacity implementation in combination with cost reduction for raw materials, and commonly available spheroidized natural graphite materials may be used.

The second graphite particle is a graphite particle having an average particle roundness lower than that of the first graphite particle, and the average particle roundness is preferable lower than 0.86, more preferably 0.85 or lower, and even more preferably 0.80 or lower. For example, a graphite particle having an average particle roundness of 0.5 or higher and lower than 0.86, or a graphite particle having an average particle roundness in the range of 0.6 to 0.85 may be used. For example, a scale-shaped particle can be suitably used.

The particle roundness is given as follows: a particle image is projected on a plane; and when designating the periphery length of a corresponding circle having the same area as the projected particle image as l and designating the periphery length of the projected particle image as L, the ratio l/L is defined as the particle roundness.

An average particle roundness can be measured with a commercially available electron microscope as follows. In an exemplary embodiment and Examples described later, the measurement was performed with a scanning electron microscope manufactured by Hitachi, Ltd. (trade name: S-2500) as follows: first, an image of a graphite particle (powder) was observed with the electron microscope at a magnification of 1000×, the image was projected on a plane, and the periphery length of the projected image, L, was determined; the periphery length of a corresponding circle having the same area as the projected image of the particle observed, l, was then determined; the ratio of the periphery length l to the periphery length of the projected image of the particle, L, i.e., l/L, was calculated for arbitrarily selected 50 particles; and the average value was used as the average particle roundness. Alternatively, this measurement can be performed with a flow-type particle image analyzer. For example, it have been confirmed that almost the same value was obtained even when the particle roundness was measured with a powder measurement apparatus available from Hosokawa Micron Corporation (trade name: FPIA-1000).

The second graphite particle is preferably an artificial graphite particle from the viewpoint that an artificial graphite particle contains fewer impurities while having an appropriate degree of graphitization and hardness and has a low electrical resistance, which is advantageous for improving battery performance such as cycle characteristics, and commonly available artificial graphite materials may be used. Examples thereof include an artificial graphite obtained by heat-treating a graphitizable carbon such as coke (e.g., petroleum coke, coal coke) and pitch (e.g., coal pitch, petroleum pitch, coal tar pitch) for graphitization at a temperature of 2000 to 3000° C., preferably at a high temperature of 2500° C. or higher; an artificial graphite obtained by graphitizing two or more graphitizable carbons; and an artificial graphite obtained by heat-treating a graphitizable carbon consisting of petroleum coke or coal coke for graphitization at a high temperature of 2500° C. or higher.

The content of the second graphite particle based on the sum of the first graphite particle and the second graphite particle is, as described above, set in the range of 1 to 30% by mass, and the content is preferably 5% by mass or more, and more preferably 10% by mass or more, and preferably 25% by mass or less, and more preferably 20% by mass or less. Artificial graphite is generally more expensive than natural graphite. Thus, in the case that artificial graphite is used for the second graphite particle, the content is preferably as low as possible in terms of cost as long as an advantageous effect of addition can be obtained sufficiently.

As described above, the ratio of a median particle diameter ($D_{50}$) to a particle diameter at 5 cumulative % ($D_5$), $D_{50}/D_5$, in a cumulative distribution of the first graphite particle is preferably smaller than the ratio of a median particle diameter ($D_{50}$) to a particle diameter at 5 cumulative % ($D_5$), $D_{50}/D_5$, in a cumulative distribution of the second graphite particle. Then, $D_{50}/D_5$ of the first graphite particle is preferably 1.5 or smaller, and more preferably 1.36 or smaller. $D_{50}/D_5$ of the second graphite particle is preferably larger than 1.5, and more preferably larger than 1.52. Here, a particle diameter $D_5$ refers to a particle diameter at an integrated value up to 5% in a particle size distribution (volume-based) obtained by using a laser diffraction/scattering method, and a particle diameter $D_{50}$ refers to a particle diameter at an integrated value up to 50% in a particle size distribution (volume-based) obtained by using a laser diffraction/scattering method.

If such particle size distribution conditions are satisfied, the tap density in saturation of the particle mixture of the first graphite particle and the second graphite particle can be, as described above, higher than the tap density in saturation of each of the first graphite particle alone and the second graphite particle alone. The tap density in saturation of the particle mixture of the first graphite particle and the second graphite particle is more preferably 1.1 g/cm$^3$ or higher, and, for example, can be set in the range of 1.1 to 1.30 g/cm$^3$ and in the range of 1.1 to 1.25 g/cm$^3$. Then, the tap density in saturation of the first graphite particle to be used is preferably higher than 0.8 g/cm$^3$, and more preferably 0.9 g/cm$^3$ or higher, and it can be lower than 1.25 g/cm$^3$, particularly 1.20 g/cm$^3$ or lower. The tap density in saturation of the second graphite particle to be used is preferably higher than 0.8 g/cm$^3$, and it can be lower than 1.10 g/cm$^3$, particularly 1.00 g/cm$^3$ or lower.

Tap density in saturation can be measured with a commercially available measuring instrument as follows. In an exemplary embodiment and Examples described later, the measurement was performed with a measuring instrument manufactured by Seishin Enterprise Co., Ltd. (trade name: Tap Denser KYT-3000) as follows: first, approximately 40 cc (40 cm$^3$) of a graphite powder was placed in a tapping cell having a volume of 45 cc (45 cm$^3$), which was then tapped 1000 times, and thereafter the tap density was calculated by using the following formula:

$$\text{tap density in saturation [g/cm}^3\text{]}=(B-A)/D$$

wherein, A: mass of tapping cell, B: total mass of tapping cell and graphite powder, and D: filling volume.

The average particle diameter of the negative electrode active material including the first graphite particle and the second graphite particle is preferably in the range of 2 to 40 μm, and more preferably in the range of 5 to 30 μm from the viewpoint of, for example, charge/discharge efficiency and input/output characteristics. In particular, the average particle diameter of the first graphite particle in a single configuration is preferably in the range of 10 to 20 μm, and the average particle diameter of the second graphite particle in a single configuration is preferably in the range of 5 to 30 μm. Here, an average particle diameter refers to a particle diameter at an integrated value up to 50% (median diameter: $D_{50}$) in a particle size distribution (volume-based) obtained by using a laser diffraction/scattering method.

The BET specific surface area (acquired in measurement at 77 K in accordance with a nitrogen adsorption method) of each of the first graphite particle and the second graphite particle is preferably in the range of 0.3 to 10 $m^2/g$, more preferably in the range of 0.5 to 10 $m^2/g$, and even more preferably in the range of 0.5 to 7.0 $m^2/g$ from the viewpoint of charge/discharge efficiency and input/output characteristics.

Use of a spheroidized particle (non-scale-shaped particle) for the first graphite particle and a particle having a roundness lower than that of the first graphite particle (e.g., a scale-shaped particle) for the second graphite particle with the mixing ratio, particle size distribution, tap density in saturation or the like controlled as described above, allow the second graphite particle to be buried between the first graphite particles in a homogeneously dispersed manner, and the first graphite particle and the second graphite particle can be packed in a high density. As a result, an adequate number of contact points are formed between the particles while the electrolytic solution sufficiently permeates, and thus the increase of resistance in cycles is suppressed and the capacity is less likely to be lowered.

The first graphite particle may be covered with amorphous carbon. Also, the second graphite particle may be covered with amorphous carbon. The surface of a graphite particle can be covered with amorphous carbon by using a conventional method. Examples of the method which can be used include a method in which the surface of a graphite particle is attached with an organic substance such as tar pitch and heat-treated; and a film-forming method such as a chemical vapor deposition method (CVD method) and sputtering method (e.g., ion beam sputtering method) with an organic substance such as a condensed hydrocarbon of benzene, xylene or the like, a vacuum deposition method, a plasma method, and an ion plating method. The second graphite particle may be also covered with amorphous carbon. Amorphous carbon covering a graphite particle can inhibit the side reaction between the graphite particle and the electrolytic solution to enhance the charge/discharge efficiency and increase the reaction capacity, and in addition allows the graphite particle to have a higher hardness.

The first graphite particle and the second graphite particle may be mixed together by using a known mixing method. An additional active material may be mixed therein, as necessary, within a range which does not impair a desired effect. The total content of the first graphite particle and the second graphite particle based on the whole of the negative electrode active material is preferably 90% by mass or more, and more preferably 95% by mass or more. The negative electrode active material may be composed only of the first graphite particle and the second graphite particle.

(Negative Electrode)

A negative electrode for a lithium ion secondary battery according to an exemplary embodiment which can be used is, for example, a negative electrode in which a negative electrode active material layer including the graphite-based negative electrode active material according to the above exemplary embodiment and a binder is provided on a negative electrode current collector.

The negative electrode may be formed by using a common slurry application method. For example, a slurry containing a negative electrode active material, a binder, and a solvent is prepared, and the slurry is applied on a negative electrode current collector, dried, and pressurized, as necessary, to obtain a negative electrode in which a negative electrode active material layer is provided on the negative electrode current collector. Examples of the method for applying a negative electrode slurry include a doctor blade method, die coater method, and a dip coating method. Alternatively, a negative electrode can be obtained by forming a thin film of aluminum, nickel, or an alloy of them as a current collector on a negative electrode active material layer which has been formed in advance, in accordance with a vapor deposition method, a sputtering method, or the like.

The binder for a negative electrode is not limited, and examples thereof include polyvinylidene fluoride (PVdF), vinylidene fluoride-hexafluoropropylene copolymers, vinylidene fluoride-tetrafluoroethylene copolymers, styrene-butadiene copolymer rubbers, polytetrafluoroethylene, polypropylene, polyethylene, polyimide, polyamideimide, methyl (meth)acrylate, ethyl (meth)acrylate, butyl (meth) acrylate, (meth)acrylonitrile, isoprene rubbers, butadiene rubbers, and fluororubbers. For the slurry solvent, N-methyl-2-pyrrolidone (NMP) or water may be used. In the case that water is used for the solvent, a thickener may be further used, such as carboxymethylcellulose, methylcellulose, hydroxymethylcellulose, ethylcellulose, and polyvinyl alcohol.

The content of the binder for a negative electrode is preferably in the range of 0.1 to 30 parts by mass, more preferably 0.5 to 25 parts by mass, and more preferably in the range of 1 to 20 parts by mass based on 100 parts by mass of the negative electrode active material from the viewpoint of binding strength and energy density, which are in a trade-off relation.

The negative electrode current collector is not limited, but preferably copper, nickel, stainless steel, molybdenum, tungsten, tantalum, or an alloy containing two or more of them from the viewpoint of electrochemical stability. Examples of the shape include a foil, a plate, and a mesh.

(Lithium Ion Secondary Battery)

The lithium ion secondary battery according to an exemplary embodiment includes the above negative electrode and positive electrode, and an electrolyte.

For fabrication of the positive electrode, for example, a slurry containing a positive electrode active material, a binder, and a solvent (and a conductive aid, as necessary) is prepared, and the slurry is applied on a positive electrode current collector, dried, and pressurized, as necessary, to form a positive electrode active material layer on the positive electrode current collector.

The positive electrode active material is not limited, and a lithium composite oxide having a layered rock salt structure or a spinel structure, or lithium iron phosphate, which has an olivine structure, may be used, for example. Examples of the lithium composite oxide include lithium manganate ($LiMn_2O_4$); lithium cobaltate ($LiCoO_2$); lithium nickelate ($LiNiO_2$); compounds obtained by substituting at least a part of the manganese, cobalt, and nickel in these lithium compounds with another metal element such as aluminum, magnesium, titanium, and zinc; nickel-substituted lithium manganates obtained by substituting at least a part of the manganese in lithium manganate with nickel; cobalt-substituted lithium nickelates obtained by substituting at least a part of the nickel in lithium nickelate with cobalt; compounds obtained by substituting a part of the manganese in a nickel-substituted lithium manganate with another metal (e.g., at least one of aluminum, magnesium, titanium, and zinc); and compounds obtained by substituting a part of the nickel in a cobalt-substituted lithium nickelate with another metal element (e.g., at least one of aluminum, magnesium, titanium, zinc, and manganese). One of these lithium composite oxides may be used singly, or two or more thereof may be used in a mixture.

The specific surface area (a BET specific surface area acquired in measurement at 77 K in accordance with a nitrogen adsorption method) of the positive electrode active material is preferably in the range of 0.01 to 10 $m^2/g$, and more preferably in the range of 0.1 to 3 $m^2/g$. A larger specific surface area requires a larger amount of a binder, which is disadvantageous in terms of the capacity density of an electrode, and a too small specific surface area may lower the ion conductivity between the electrolytic solution and the active material.

The average particle diameter of the positive electrode active material is, for example, preferably in the range of 0.1 to 50 μm, more preferably 1 to 30 μm, and even more preferably 5 to 25 μm from the viewpoint of the reactivity to the electrolytic solution and rate characteristics. Here, an average particle diameter refers to a particle diameter at an integrated value up to 50% (median diameter: $D_{50}$) in a particle size distribution (volume-based) obtained by using a laser diffraction/scattering method.

The binder for a positive electrode is not limited, and the binders for a negative electrode can be used. Among them, polyvinylidene fluoride is preferred from the viewpoint of versatility and low cost. The content of the binder for a positive electrode is preferably in the range of 1 to 25 parts by mass, more preferably 2 to 20 parts by mass, and even more preferably 2 to 10 parts by mass based on 100 parts by mass of the positive electrode active material from the viewpoint of binding strength and energy density, which are in a trade-off relation. Further, examples of a binder other than polyvinylidene fluoride (PVdF) include vinylidene fluoride-hexafluoropropylene copolymers, vinylidene fluoride-tetrafluoroethylene copolymers, styrene-butadiene copolymer rubbers, polytetrafluoroethylene, polypropylene, polyethylene, polyimide, and polyamideimide. For the slurry solvent used in fabricating the positive electrode, N-methyl-2-pyrrolidone (NMP) may be used.

The positive electrode current collector is not limited, and aluminum, titanium, tantalum, stainless steel (SUS), another valve metal, or an alloy of them may be used from the viewpoint of electrochemical stability. Examples of the shape include a foil, a plate, and a mesh. In particular, an aluminum foil can be suitably used.

A conductive aid may be added to the positive electrode active material layer for the purpose of lowering the impedance. Examples of the conductive aid include carbonaceous fine particles such as graphite, carbon black, and acetylene black.

For the electrolyte, a non-aqueous electrolytic solution in which a lithium salt is dissolved in one or two or more non-aqueous solvents may be used. The non-aqueous solvent is not limited, and example thereof include cyclic carbonates such as ethylene carbonate (EC), propylene carbonate (PC), butylene carbonate (BC), and vinylene carbonate (VC); chain carbonates such as dimethyl carbonate (DMC), diethyl carbonate (DEC), ethyl methyl carbonate (EMC), and dipropyl carbonate (DPC); aliphatic carboxylates such as methyl formate, methyl acetate, and ethyl propionate; γ-lactones such as γ-butyrolactone; chain ethers such as 1,2-ethoxyethane (DEE) and ethoxymethoxyethane (EME); and cyclic ethers such as tetrahydrofuran and 2-methyltetrahydrofuran. Examples of other non-aqueous solvents which can be used include aprotic organic solvents such as dimethyl sulfoxide, 1,3-dioxolane, dioxolane derivatives, formamide, acetamide, dimethylformamide, acetonitrile, propionitrile, nitromethane, ethylmonoglyme, phosphate triesters, trimethoxymethane, sulfolane, methylsulfolane, 1,3-dimethyl-2-imidazolidinone, 3-methyl-2-oxazolidinone, propylene carbonate derivatives, tetrahydrofuran derivatives, ethyl ether, 1,3-propanesultone, anisole, and N-methylpyrrolidone.

The lithium salt to be dissolved in the non-aqueous solvent is not limited, and examples thereof include $LiPF_6$, $LiAsF_6$, $LiAlCl_4$, $LiClO_4$, $LiBF_4$, $LiSbF_6$, $LiCF_3SO_3$, $LiCF_3CO_2$, $Li(CF_3SO_2)_2$, $LiN(CF_3SO_2)_2$, and lithium bis(oxalate)borate. One of these lithium salts may be used singly, or two or more thereof may be used in combination. Further, a polymer component may be contained as the non-aqueous electrolyte.

A separator may be provided between the positive electrode and the negative electrode. For the separator, a porous film made of a polyolefin such as polypropylene and polyethylene, a fluororesin such as polyvinylidene fluoride, or polyimide, woven fabric, nonwoven fabric, or the like may be used.

Examples of the shape of a battery include a cylinder, a rectangle, a coin type, a button type, and a laminate type. In the case of a laminate type, it is preferred to use a laminate film for an outer package to contain the positive electrode, the separator, the negative electrode, and the electrolyte. This laminate film includes a resin base material, a metal foil layer, and a heat-seal layer (sealant). Examples of the resin base material include polyester and nylon, and examples of the metal foil layer include an aluminum foil, an aluminum alloy foil, and a titanium foil. Examples of the material for the hot-seal layer include thermoplastic polymer materials such as polyethylene, polypropylene, and polyethylene terephthalate. Each of the resin base material layer and the metal foil layer is not limited to a single layer configuration, and may be in two or more layers. From the viewpoint of versatility and cost, an aluminum laminate film is preferred.

The positive electrode, the negative electrode, and the separator disposed therebetween are contained in an outer package container made of a laminate film, etc., and the electrolytic solution is injected therein, followed by sealing the outer package container. A structure in which an electrode group having a plurality of electrode pairs laminated is contained may be employed.

FIG. 1 illustrates a cross-sectional view of an example of the lithium ion secondary battery according to an exemplary embodiment (laminate type). As illustrated in FIG. 1, the lithium ion secondary battery according to an exemplary embodiment includes: a positive electrode including a positive electrode current collector 3 made of a metal such as an aluminum foil and a positive electrode active material layer 1 provided thereon and containing a positive electrode active material; and a negative electrode including a negative electrode current collector 4 made of a metal such as a copper foil and a negative electrode active material layer 2 provided thereon and containing a negative electrode active material. The positive electrode and the negative electrode are laminated with a separator 5 made of a nonwoven fabric or a polypropylene microporous membrane interposed therebetween so that the positive electrode active material layer 1 and the negative electrode active material layer 2 are positioned on opposite surfaces of the separator 5. This electrode pair is contained in a container formed of outer packages 6, 7 made of an aluminum laminate film or the like. The positive electrode current collector 3 is connected to a positive electrode tab 9 and the negative electrode current collector 4 is connected to a negative electrode tab 8, and these tabs are extracted through the container to the outside. An electrolytic solution is injected into the container, and the container is sealed. Alternatively, a structure in which an electrode group having a plurality of electrode pairs laminated is contained in a container may be used.

EXAMPLES

Examples 1 to 3

A spheroidized natural graphite particle was provided as high-roundness graphite A and a scale-shaped artificial graphite was provided as low-roundness graphite B. As a result of the above-described measurement method, it was confirmed that the average particle roundness of the graphite A was 0.86 or higher and higher than the average particle roundness of the scale-shaped graphite B. In addition, it was confirmed that by using a commercially available laser diffraction/scattering particle size analyzer that $D_{50}/D_5$ of the graphite A was 1.36 or smaller and $D_{50}$ of the graphite A was in the range of 10 to 20 and that $D_{50}/D_5$ of the graphite B was larger than 1.52 and $D_{50}$ of the graphite B was in the range of 5 to 30 The tap densities in saturation of the graphite A and the graphite B were measured in accordance with the above-described measurement method to be 1.08 g/cm$^3$ and 0.99 g/cm$^3$, respectively. The tap density in saturation of the particle mixture of the graphite A and the graphite B was measured in the same manner, and the result was as shown in Table 1.

The graphite A and the graphite B were mixed together at the mass ratio shown in Table 1, and the mixture (negative electrode active material) was mixed with a 1.0 wt % aqueous solution of carboxymethylcellulose to prepare a slurry. A styrene-butadiene copolymer as a binder was mixed therein.

This slurry was applied on one surface of a copper foil having a thickness of 10 μm, and the coating film was dried. Thereafter, the coating film (negative electrode coating film) was roll-pressed so that the density reached 1.5 g/cm$^3$ to obtain a negative electrode sheet having a size of 33×45 mm.

A mixed oxide (positive electrode active material) in which $Li(Li_{0.1}Mn_{1.9})O_4$ and $LiNi_{0.85}Co_{0.15}O_2$ were mixed together at a mass ratio of 75:25 and polyvinylidene fluoride were dispersed in N-methyl-2-pyrrolidone to prepare a slurry. This slurry was applied on both surfaces of an aluminum foil, and the coating films were dried. Thereafter, the coating film (positive electrode coating films) were roll-pressed so that the density reached 3.0 g/cm$^3$ to obtain a positive electrode sheet having a size of 30×40 mm.

The negative electrode sheet was stacked on each surface of the positive electrode sheet with a separator made of a porous polyethylene film having a thickness of 25 μm interposed therebetween so that the positive electrode coating film and the negative electrode coating film were positioned on opposite surfaces of the separator. An extraction electrode for a positive electrode and an extraction electrode for a negative electrode were provided, and then the laminate was covered with a laminate film, into which an electrolytic solution was injected, and the resultant was sealed.

The electrolytic solution used was a solution obtained by dissolving a lithium salt ($LiPF_6$) in a mixture of ethylene carbonate and diethyl carbonate at a volume ratio of 3:7 so that the concentration of the lithium salt reached 1.0 mol/L.

The lithium ion secondary battery fabricated as described above was subjected to a charge/discharge cycle test (Cycle-Rate: 1 C, temperature: 45° C., upper limit voltage: 4.2 V, lower limit voltage: 3.0 V), and the capacity retention rate after 400 cycles was determined. The result is shown in Table 1.

Comparative Example 1

A lithium ion secondary battery was fabricated in the same manner as in Examples 1 to 3 except that only graphite A was used for the negative electrode active material.

A charge/discharge cycle test was performed under the same conditions as in Examples 1 to 3, and the capacity retention rate after 400 cycles was 70%.

Reference Example 1

A lithium ion secondary battery was fabricated in the same manner as in Examples 1 to 3 except that only graphite B was used for the negative electrode active material.

A charge/discharge cycle test was performed under the same conditions as in Examples 1 to 3, and the capacity retention rate after 400 cycles was 80%.

TABLE 1

| | Content of low-roundness graphite B (% by mass) | Content of high-roundness graphite A (% by mass) | Tap density of low-roundness graphite B (g/cm$^3$) | Tap density of high-roundness graphite A (g/cm$^3$) | Tap density of graphite mixture (g/cm$^3$) | Capacity retention rate after 400 cycles (%) |
|---|---|---|---|---|---|---|
| Comparative Example 1 | 0 | 100 | — | 1.08 | — | 70 |
| Example 1 | 5 | 95 | 0.99 | 1.08 | 1.10 | 77 |
| Example 2 | 10 | 90 | 0.99 | 1.08 | 1.10 | 80 |
| Example 3 | 20 | 80 | 0.99 | 1.08 | 1.12 | 90 |
| Reference Example 1 | 100 | 0 | 0.99 | — | — | 80 |

As can be seen from Table 1, in the case that the graphite A having a high roundness and small $D_{50}/D_5$ and the graphite B having a low roundness and large $D_{50}/D_5$ are mixed (Examples 1 to 3), the capacity retention rate after 400 cycles is enhanced compared to the case that the graphite B is not added (Comparative Example 1), even when the amount of the graphite B mixed is small. It can be seen that the capacity retention rate is enhanced in the case that the content of the graphite B is 20% by mass (Example 3), compared to the case of the graphite B in a single configuration (Reference Example 1).

In the foregoing, the present invention has been described with reference to the exemplary embodiments and the Examples; however, the present invention is not limited to the exemplary embodiments and the Examples. Various modifications understandable to those skilled in the art may be made to the constitution and details of the present invention within the scope thereof.

The present application claims the right of priority based on Japanese Patent Application No. 2014-73710 filed on Mar. 31, 2014, the entire disclosure of which is incorporated herein by reference.

REFERENCE SIGNS LIST

1 positive electrode active material layer
2 negative electrode active material layer
3 positive electrode current collector
4 negative electrode current collector
5 separator
6 laminate outer package
7 laminate outer package
8 negative electrode tab
9 positive electrode tab

The invention claimed is:

1. A graphite-based negative electrode active material comprising a first graphite particle being spheroidized and a second graphite particle having a roundness lower than a roundness of the first graphite particle, wherein a content of the second graphite particle based on a sum of the first graphite particle and the second graphite particle is in a range of 5 to 20% by mass, a ratio of a median particle diameter ($D_{50}$) to a particle diameter at 5 cumulative % ($D_5$), $D_{50}/D_5$, in a cumulative distribution of the first graphite particle is smaller than a ratio of a median particle diameter ($D_{50}$) to a particle diameter at 5 cumulative % ($D_5$), $D_{50}/D_5$, in a cumulative distribution of the second graphite particle, a tap density in saturation of a particle mixture of the first graphite particle and the second graphite particle is higher than both a tap density in saturation of the first graphite particle and a tap density in saturation of the second graphite particle, an average particle roundness of the first graphite particle is in a range of 0.86 to 1, and an average particle roundness of the second graphite particle is lower than the average particle roundness of the first graphite particle, and the average particle roundness of the second graphite particle is lower than 0.85.

2. The graphite-based negative electrode active material according to claim 1, wherein $D_{50}/D_5$ of the first graphite particle is 1.5 or smaller.

3. The graphite-based negative electrode active material according to claim 1, wherein $D_{50}/D_5$ of the first graphite particle is 1.36 or smaller.

4. The graphite-based negative electrode active material according to claim 1, wherein $D_{50}/D_5$ of the second graphite particle is larger than 1.5.

5. The graphite-based negative electrode active material according to claim 1, wherein $D_{50}/D_5$ of the second graphite particle is larger than 1.52.

6. The graphite-based negative electrode active material according to claim 1, wherein the tap density in saturation of the particle mixture of the first graphite particle and the second graphite particle is 1.1 g/cm$^3$ or higher.

7. The graphite-based negative electrode active material according to claim 1, wherein the tap density in saturation of the first graphite particle is higher than 0.8 g/cm$^3$.

8. The graphite-based negative electrode active material according to claim 7, wherein the tap density in saturation of the second graphite particle is higher than 0.8 g/cm$^3$.

9. The graphite-based negative electrode active material according to claim 1, wherein the content of the second graphite particle based on the sum of the first graphite particle and the second graphite particle is in a range of 10 to 20% by mass.

10. The graphite-based negative electrode active material according to claim 1, wherein a median particle diameter ($D_{50}$) of the first graphite particle is in a range of 10 to 20 μm, and a median particle diameter ($D_{50}$) of the second graphite particle is in a range of 5 to 30 μm.

11. The graphite-based negative electrode active material according to claim 1, wherein the first graphite particle comprises a natural graphite particle.

12. The graphite-based negative electrode active material according to claim 11, wherein the first graphite particle is covered with amorphous carbon.

13. The graphite-based negative electrode active material according to claim 1, wherein the second graphite particle comprises a scale-shaped particle.

14. The graphite-based negative electrode active material according to claim 1, wherein the second graphite particle comprises an artificial graphite particle.

15. A negative electrode for a lithium ion secondary battery, comprising the graphite-based negative electrode active material according to claim 1.

16. A lithium ion secondary battery comprising: a positive electrode including a positive electrode active material capable of intercalating and deintercalating a lithium ion; the negative electrode according to claim 15; and a non-aqueous electrolytic solution.

* * * * *